(12) United States Patent
Cleveland et al.

(10) Patent No.: US 9,098,397 B2
(45) Date of Patent: Aug. 4, 2015

(54) EXTENDING CACHE FOR AN EXTERNAL STORAGE SYSTEM INTO INDIVIDUAL SERVERS

(75) Inventors: Lee D. Cleveland, West Concord, MN (US); John C. Elliott, Tucson, AZ (US); Yu-Cheng Hsu, Tucson, AZ (US); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 921 days.

(21) Appl. No.: 13/079,432

(22) Filed: Apr. 4, 2011

(65) Prior Publication Data

US 2012/0254509 A1  Oct. 4, 2012

(51) Int. Cl.
G06F 12/00 (2006.01)
G06F 13/00 (2006.01)
G06F 12/02 (2006.01)
G06F 12/08 (2006.01)
H04L 29/08 (2006.01)

(52) U.S. Cl.
CPC ........ G06F 12/0246 (2013.01); G06F 12/0868 (2013.01); H04L 67/2852 (2013.01)

(58) Field of Classification Search
None
See application file for complete search history.

(56) References Cited

U.S. PATENT DOCUMENTS

| 6,629,200 | B1* | 9/2003 | Kanamaru et al. | 711/113 |
|---|---|---|---|---|
| 6,981,070 | B1 | 12/2005 | Luk et al. | |
| 7,500,055 | B1 | 3/2009 | Oesterreicher et al. | |
| 2002/0004887 | A1 | 1/2002 | Kubo | |
| 2002/0007404 | A1* | 1/2002 | Vange et al. | 709/217 |
| 2005/0027798 | A1* | 2/2005 | Chiou et al. | 709/203 |
| 2005/0144223 | A1 | 6/2005 | Yang et al. | |
| 2010/0070661 | A1* | 3/2010 | Cherry et al. | 710/19 |
| 2010/0088739 | A1* | 4/2010 | Hall et al. | 726/1 |
| 2010/0095053 | A1* | 4/2010 | Bruce et al. | 711/103 |
| 2010/0199125 | A1* | 8/2010 | Reche | 714/6 |

FOREIGN PATENT DOCUMENTS

| CN | 101478570 A | 7/2009 |
|---|---|---|
| JP | S61173355 A | 8/1986 |
| JP | S6476345 A | 3/1989 |
| JP | H10124359 A | 5/1998 |
| JP | 2000076152 A | 3/2000 |
| WO | WO2012/137098 A1 | 10/2012 |

OTHER PUBLICATIONS

Jim Handy, The Cache Memory Book, 1998, Academic Press, Inc., second edition, pp. 64-67.*

(Continued)

*Primary Examiner* — Sean D Rossiter
(74) *Attorney, Agent, or Firm* — Stephen R. Tkacs; Stephen J. Walder, Jr.; Randall J. Bluestone

(57) ABSTRACT

Mechanisms are provided for extending cache for an external storage system into individual servers. Certain servers may have cards with cache in the form of dynamic random access memory (DRAM) and non-volatile storage, such as flash memory or solid-state drives (SSDs), which may be viewed as actual extensions of the external storage system. In this way, the storage system is distributed across the storage area network (SAN) into various servers. Several new semantics are used in communication between the cards and the storage system to keep the read caches coherent.

20 Claims, 5 Drawing Sheets

(56) References Cited

OTHER PUBLICATIONS

Microsoft Computer Dictionary, 2002, Microsoft Press, fifth edition, p. 474.*

"SSDs For Servers", Processor, Tech & Trends, vol. 32, Issue 13, Jun. 18, 2010, pp. 28 (3 pages).

Noronha, Ranjit, et al., "Can High Performance Software DSM Systems Designed With InfiniBand Features Benefit from PCI-Express?", IEEE International Symposium on Cluster Computing and the Grid, V. 2, May 9-12, 2005, pp. 945-952.

Weiss, Ron, "Exadata Smart Flash Cache and the Sun Oracle Database Machine", An Oracle White Paper, Oct. 2009, 10 pages.

U.S. Appl. No. 13/837,335.

Nelson, Michael N. et al., "Catching in the Sprite Network File System", ACM Transactions on Computer Systems, Vol. 6, No. 1, Feb. 1988, 21 pages.

\* cited by examiner

EXTENDING CACHE FOR AN EXTERNAL STORAGE SYSTEM INTO INDIVIDUAL SERVERS

BACKGROUND

The present application relates generally to an improved data processing apparatus and method and more specifically to mechanisms for extending cache for an external storage system into individual servers.

A storage area network (SAN) is a dedicated storage network that provides access to consolidated, block level storage. SANs primarily make storage devices accessible to servers so that the devices appear as locally attached to the operating system. A SAN may have its own network of storage devices that are generally not accessible through the regular network by regular devices.

In a typical configuration, external storage systems connect by a SAN. Inside the storage system is a cache, which typically comprises dynamic random access memory (DRAM). The cache reduces latency seen by the server; however, this cache stores most recently used data by all servers attached to the external storage system. SAN delays and delay in the storage system due to cache misses affect latency.

SUMMARY in one illustrative embodiment, a method, in a data processing system, is provided for extending cache for a storage system in a storage area network. The method comprises storing a copy of data in an extended cache card attached to a server. The extended cache card comprises anon-volatile memory for storing copies of data read from or written to an external storage system by the server. Responsive to receiving from the server a request to read a first portion of data from the external storage system, the method comprises determining whether the extended cache card stores an up-to-date copy of the first portion of data. Responsive to a determination that the extended cache card stores an up-to-date copy of the first portion of data, the method comprises sending the copy of the first portion of data from the extended cache card to the server.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for extending cache for an external storage system into individual servers. Certain servers may have cards with cache in the form of dynamic random access memory (DRAM) and non-volatile storage, such as flash memory or solid-state drives (SSDs), which may be viewed as actual extensions of the external storage system. In this way, the storage system is distributed across the storage area network (SAN) into various servers. Several new semantics are used in communication between the cards and the storage system to keep the read caches coherent. In one embodiment, writes are done via writethrough so that the server always has the latest copy of the data.

In an alternative embodiment, the card writes a TOUCH semantic to the storage server with no data being written, only the logical block addresses (LBAs) that are updated. When receiving a TOUCH semantic, the external storage system invalidates any copy of the LBAs it has in its cache and sends INVALIDATE semantics to all external cache cards in other servers that may have accessed the LBAs.

Figure 1:
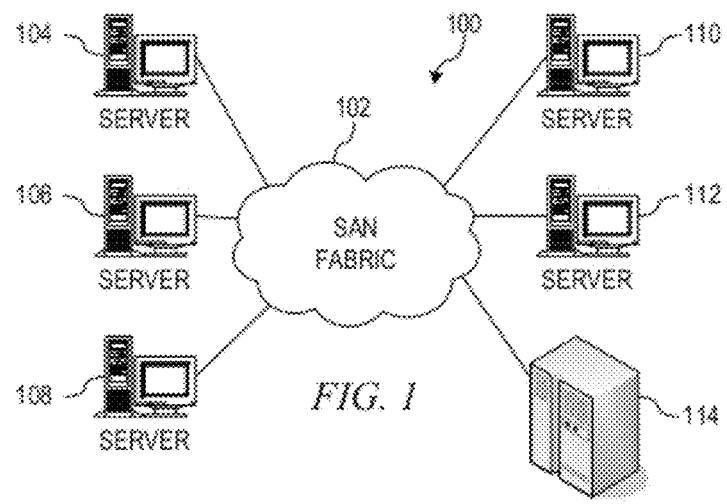
FIG. 1 depicts a pictorial representation of an example distributed data processing system in which aspects of the illustrative embodiments may be implemented.
Figure 2:
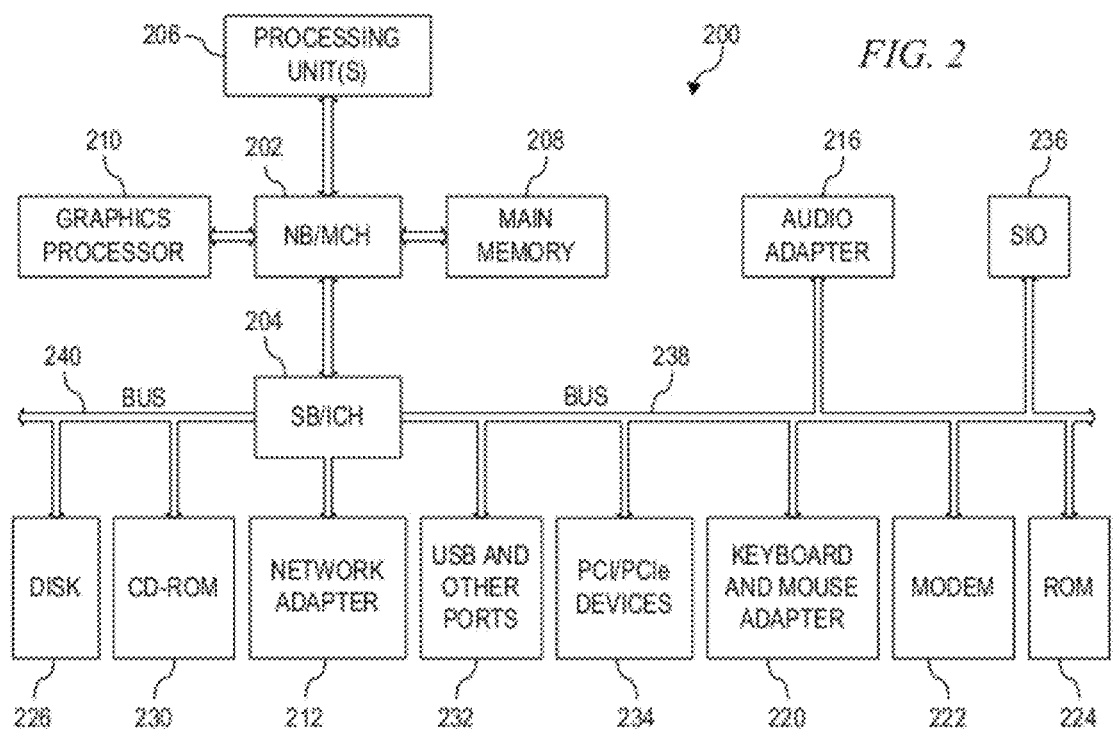
FIG. 2 is a block diagram of an example data processing system in which aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitations with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one storage area network (SAN) fabric 102, which is the medium used to provide communication links between various devices and computers connected together within distributed data processing system 100. The SAN fabric 102 may include connections, such as wire, wireless communication links, fiber optic cables, switches, routers, etc.

In the depicted example, servers 104, 106, 108, 110, 112 and storage system 114 connect to SAN fabric 102. Servers 104, 106, 108, 110, 112 write data to and read data from external storage systems, such as storage system 114. External storage systems typically include cache to reduce latency. However, in many configurations, several servers may access the same external storage, resulting in contention for resources and cache affinity going to other servers.

SAN fabric 102 may be any interconnection, such as Fibre Channel, Fibre Connection (FICON), Serial Attached Small Computer Systems Interconnect (SAS), InfiniBand (IB), Fibre Channel over Convergence Enhanced Ethernet (FCO-CEE), Internet Small Computer Systems Interconnect (iSCSI), etc.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/IGH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.

As a server, data processing system 200 may be, for example, an eServer™ System P® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
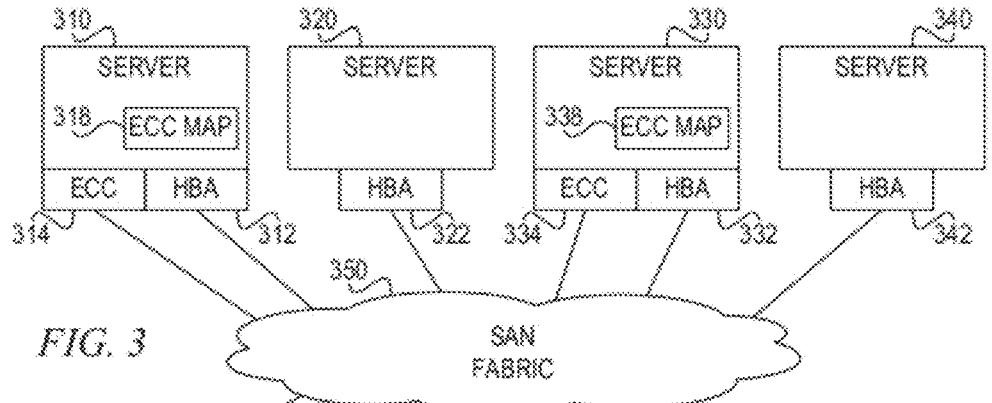
FIG. 3 is a diagram illustrating a storage area network with extended cache in accordance with an illustrative embodiment.

FIG. 3 is a diagram illustrating a storage area network with extended cache in accordance with an illustrative embodiment. Servers 310, 320, 330, 340 and storage system 360 connect to SAN fabric 350. Server 320 connects to SAN fabric 350 via host bus adapter (HBA) 322. Server 340 connects to SAN fabric 350 via HBA 342. Storage system 360 connects to SAN fabric 350 via HBA 364.

In accordance with the illustrative embodiment, server 310 may connect to SAN fabric 350 via HBA 312 or extended cache card (ECC) 314, and server 330 may connect to SAN fabric 350 via HBA 332 or ECC 334. ECC 314 and ECC 334 add cache to their servers in the form of dynamic random access memory (DRAM) and non-volatile memory, such as flash memory or solid state drives (SSDs) that are viewed as actual extensions of external storage system 360. In this way, storage system 360 may be distributed across the SAN into servers 310 and 330.

ECC 314, 334 may be a Peripheral Component interconnect Express (PCIe) card. ECC 314, 334 may include non-volatile memory and a redundant array of independent disks (RAID) controller and a SAN interface, which logically become part of the storage system by keeping caches coherent to the external storage system 360. When server 310, for example, performs a read, server 310 keeps a directory bit map, ECC map 318, which keeps a record of which servers having extended cache cards have fetched particular logical block address (LBA) ranges. Similarly, server 330 has ECC map 338 to record which servers having extended cache cards have fetched particular LBA ranges, ECC maps 318, 338 also record which LBAs are updated by servers. Alternatively, ECC maps 318, 338 may be separated into separated maps for reads and writes.

When a server updates a LBA range, servers 310, 330 search ECC maps 318, 338 to determine whether the data is present in ECC 314 or ECC 334. If a server finds a record for the data in ECC 314, 334, the server issues a Server Invalidate semantic to inform the ECC 314, 334 that they are holding stale data. ECCs 314, 334 are then responsible for invalidating the cache entry in its non-volatile memory and/or DRAM and must go to storage system 360 to update the data.

In one example embodiment, when a server with an ECC, such as server 310 or server 330 in FIG. 3, does a write, the ECC updates its directories, places the data in its cache, and writes the data to external storage system 360. Thus, external storage system 360 always has the most up-to-date copy of the data.

To speed up latency of writes, if the ECC 318, 338 has a method of holding up during a power outage, the external storage system 360 only has to have one copy of the write data. If there is a hardware or software failure with the copy of the data in the external storage system 360, then storage system 360 issues a command to the ECC with the updated data telling it to send a copy to the external storage system 360.

When write data ages out of the ECC 314, 334 and has not been updated by any other server, then the ECC notifies the external storage system 360 that it needs another copy of the data. In one example embodiment, the ECC 314, 334 does a normal write without indicating that it has kept a copy. The storage system 360 accepts the write and makes a copy. When the storage system 360 completes the write successfully, the ECC 314, 334 may discard its copy of the data.

In another illustrative embodiment, the external cache cards 314, 334 may come in pairs and perform writes that are write-back to the external storage system 360. The external storage system 360 must keep the caches coherent and issue flushes when necessary. When a server 310, 330 does a write to its extended cache card, the ECC 314, 334 saves the contents and writes a Touch semantic to the storage system 360. The Touch semantic does not include any data, but indicates the LBAs that are updated.

When the storage system 360 receives the Touch semantic, storage system 360 invalidates any copy of the LBAs it has in its cache and sends Invalidate semantics to all ECC cards in any server that may have updated the LBAs. Thus, storage system 360 may keep an ECC map 362 to record which LBAs are updated or read by which servers.

When and if time permits, the ECC card 314, 334 may send a copy of the data to the external storage system 360 but indicate in the write command that it is a copy of the updated data. The ECC map 318, 338, 368 may not be changed as to the owner. In this way, any reads to this LBA range can be serviced by the external storage system 360 without going to the ECC. If a server, such as server 310, does a read without it yet being copied to the ECC 314, the external storage system 360 issues a Send Copy command telling the controlling ECC, such as ECC 334, that it has the most up-to-date copy of the data but to write a copy to external storage system 360. The external storage system 360 may then service the read.

If another server, such as server 340, writes to the external storage server 360, any of the data within the LEA range, external storage server 360 issues either an Invalidate command or a Flush and Invalidate command to the ECC that had the data, such as ECC 334. Flush requires the controlling ECC to write the data to storage system 360. This may be done if another device had written on a granularity less than what the external storage system uses as a minimum size, i.e., a page or track or the like. Storage system 360 may then merge the data.

If another ECC, such as ECC 314, sends a Touch command and the external storage system determines that some or all of the LEA range is being controlled by another ECC, such as ECC 334, then it issues Invalidate semantics to ECC 334 for the LBAs updated by ECC 314.

The devices in the SAN shown in FIG. 3 may issue the semantics and commands using custom commands, custom bits in the cache descriptor block (CDB), or messages using writes to certain memory regions.

Figure 4:
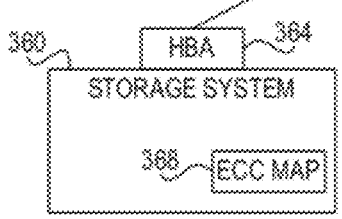
FIG. 4 is a block diagram illustrating an extended cache card in accordance with an illustrative embodiment.
Figure 4:
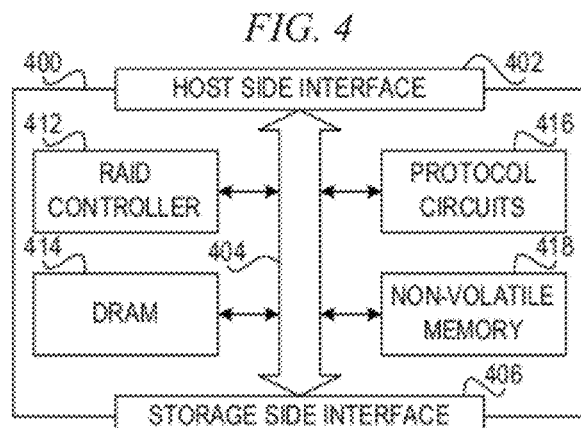

FIG. 4 is a block diagram illustrating an extended cache card in accordance with an illustrative embodiment. Extended cache card (ECC) 400 has a system bus 404 connected to a host side interface 402 and a storage side interface 406. Redundant array of independent disks (RAID) controller 412, dynamic random access memory (DRAM) 414, protocol circuits 416, and non-volatile memory 418 connect to system bus 404. RAID controller 412 may receive reads and writes from the server through host side interface 402 and perform reads from DRAM 414, non-volatile memory 418, a pair ECC, and/or the external storage system. In fact, RAID controller 412 could potentially read from or write to any ECC in the SAN. When ECC 400 reads or writes data, the data may be cached in DRAM 414 or non-volatile memory 418. RAID controller 412 may read data from or write data to an external storage system via storage side interface 406.

Protocol circuits 416 may allow ECC 400 to communicate via the SAN fabric using Fibre Channel, Fibre Connection (FICON), Serial Attached Small Computer Systems interconnect (SAS), InfiniBand (IB), Fibre Channel over Convergence Enhanced Ethernet (FCOCEE), or Internet Small Computer Systems Interconnect (iSCSI) protocols, for instance.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium's) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, cart be implemented by special purpose hardware-based systems that perform the specified functions or acts, or combinations of special purpose hardware and computer instructions.

Figure 5:
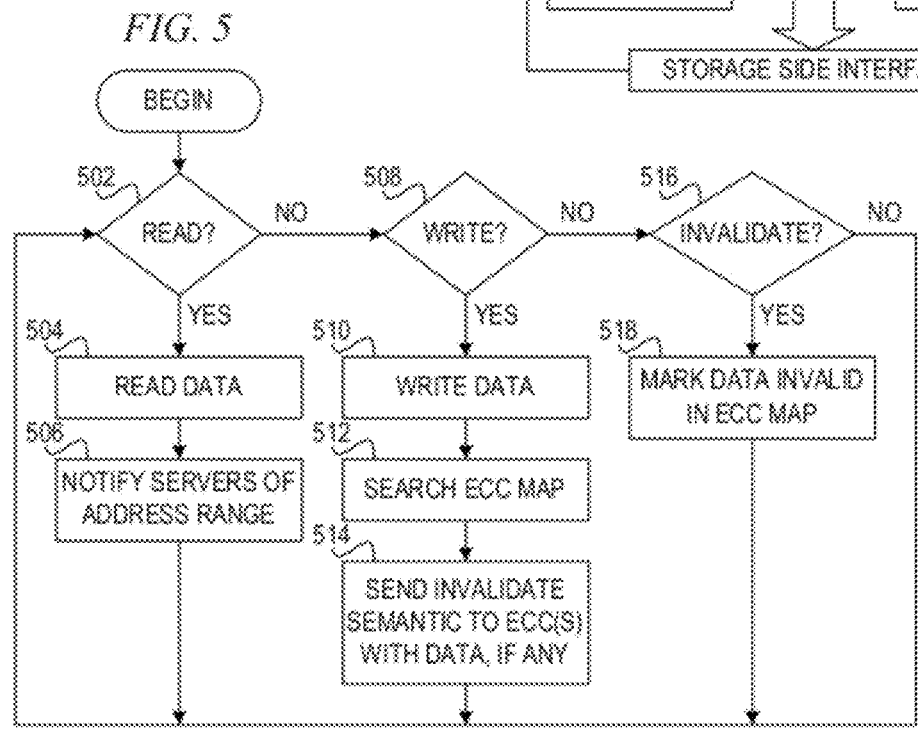
FIG. 5 is a flowchart illustrating operation of a server with extended cache for an external storage system with writethrough in accordance with an illustrative embodiment.

FIG. 5 is a flowchart illustrating operation of a server with extended cache for an external storage system with writethrough in accordance with an illustrative embodiment. Operation begins, and the server determines whether it is to perform a read (block 502). Utile server performs a read, the server reads data (block 504) and notifies other servers of the address range (block 506). Thereafter, operation returns to block 502 to determine whether the server is to perform a read. The server may perform the read by sending a read command to an extended cache card, which either returns the data from its cache or reads the data from external storage. The server may notify other servers that it has an up-to-date copy of the data so other servers know to send an Invalidate semantic to the server's extended cache card (ECC) when updating the data.

If the server does not perform a read in block 502, the server determines whether it is to perform a write (block 508). If the server performs a write, the server writes the data (block 510), searches the extended cache card (ECC) map to identify whether any ECCs have a copy of the data (block 512), and sends an Invalidate semantic to any ECCs that have the data, if any (block 514). Thereafter, operation returns to block 502 to determine whether the server is to perform a read.

If the server does not perform a write in block 508, then the server determines whether it receives an Invalidate semantic (block 516). If the server receives an Invalidate semantic, then the server marks the data as invalid in the ECC map (block 518). Thereafter, or if the server does not receive an Invalidate semantic in block 516, operation returns to block 502 to determine whether the server is to perform a read.

Figure 6:
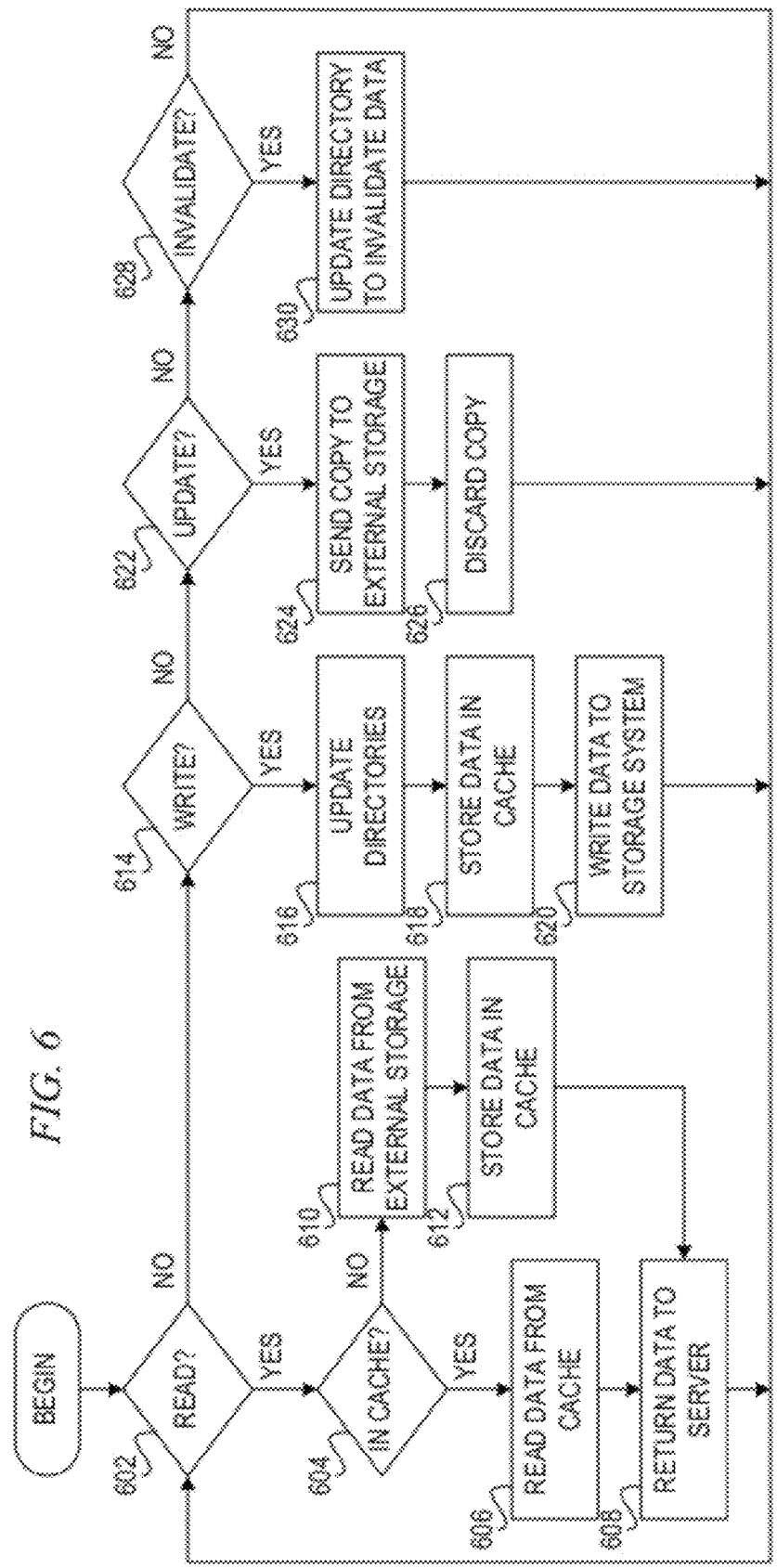
FIG. 6 is a flowchart illustrating operation of an extended cache card for extending cache for an external storage system with writethrough in accordance with an illustrative embodiment.

FIG. 6 is a flowchart illustrating operation of an extended cache card for extending cache for an external storage system with writethrough in accordance with an illustrative embodiment. Operation begins, and the extended cache card (ECC) determines whether it receives a read command from its server (block 602). If the ECC receives a read command, the ECC determines whether the data is in cache in the ECC (block 604). If the data is in cache, the ECC reads data from the cache (block 606) and returns the read data to the server (block 608), and operation returns to block 602 to determine whether the ECC receives a read command from its server.

If the data is not in cache in the ECC in block 604, then the ECC reads data from the external storage (block 610), stores data in cache (block 612), and returns the read data to the server (block 608). Thereafter, operation returns to block 602 to determine whether the ECC receives a read command from its server.

If the ECC does not receive a read command in block 602, the ECC determines whether it receives a write command from its server (block 614). If the ECC receives a write command, the ECC updates its directories (block 616), stores the data in its cache (block 618), and writes the data to the storage system (block 620). Thereafter, operation returns to block 602 to determine whether the ECC receives a read command from its server.

If the ECC does not receive a write command from its server in block 614, the ECC determines whether to update data to the storage system (block 622). The ECC may update data to the storage system if the data ages out of the ECC cache and has not been updated by any other server, for example. If the ECC determines that it is to update data at the storage system, the ECC sends a copy of the data to the external storage system (block 624) and discards its copy of the data (block 626). Thereafter, operation returns to block 602 to determine whether the ECC receives a read command from its server.

If the ECC does not update data in block 622, the ECC determines whether it receives an Invalidate semantic (block 628). If the ECC receives an Invalidate semantic, the ECC updates its directory to invalidate the data (block 630). Thereafter, or if the ECC does not receive an Invalidate semantic, operation returns to block 602 to determine whether the ECC receives a read command from its server.

Figure 7:
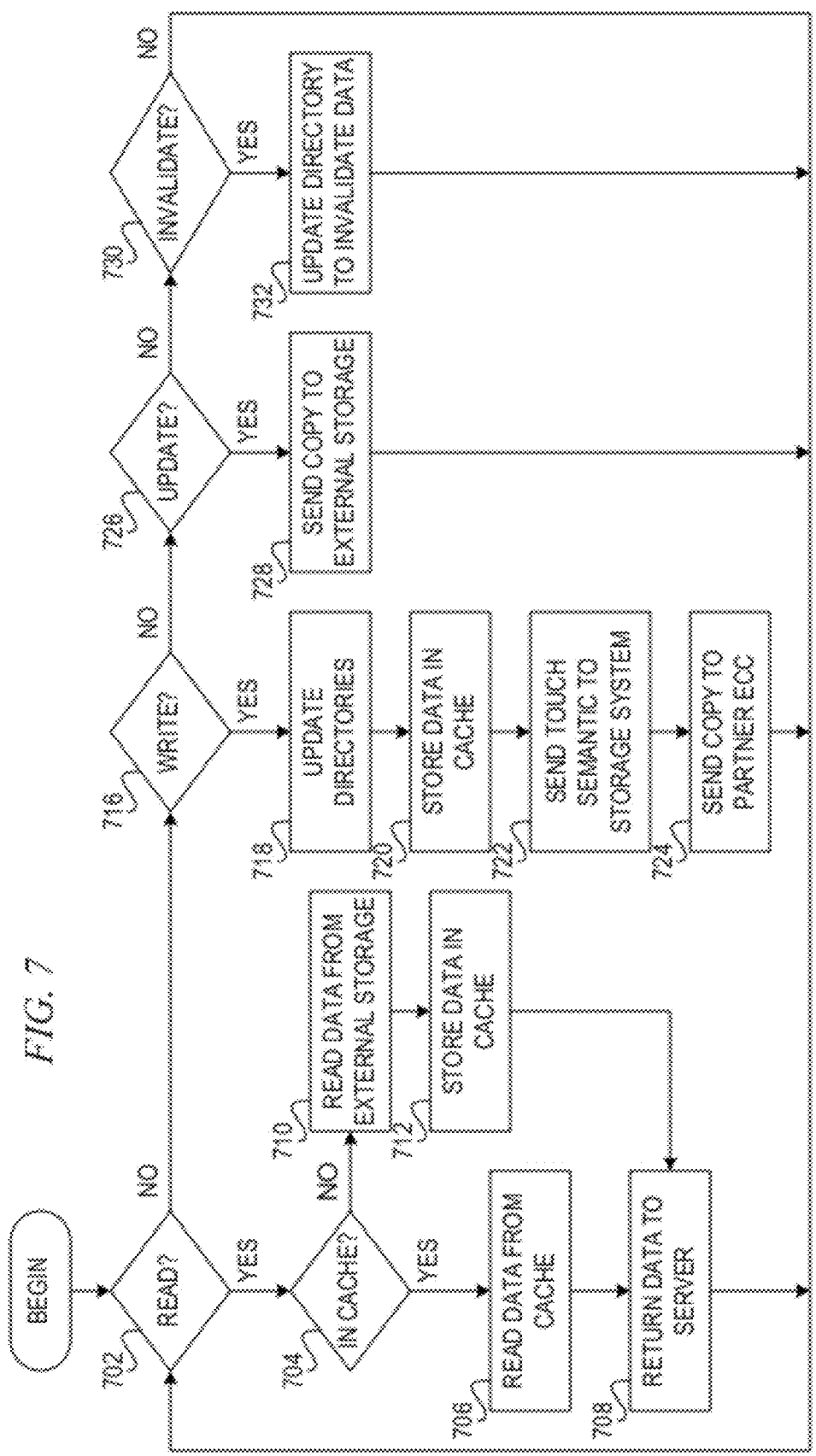
FIG. 7 is a flowchart illustrating operation of an extended cache card for extending cache for an external storage system with writeback in accordance with an illustrative embodiment.

FIG. 7 is a flowchart illustrating operation of an extended cache card for extending cache for an external storage system with writeback in accordance with an illustrative embodiment. Operation begins, and the extended cache card (ECC) determines whether it receives a read command from its server (block 702). If the ECC receives a read command, the ECC determines whether the data is in cache in the ECC (block 704). If the data is in cache, the ECC reads data from the cache (block 706) and returns the read data to the server (block 708), and operation returns to block 702 to determine whether the ECC receives a read command from its server.

If the data is not in cache in the ECC in block 704, then the ECC reads data from the external storage (block 710), stores data in cache (block 712), and returns the read data to the server (block 708). Thereafter, operation returns to block 702 to determine whether the ECC receives a read command from its server.

If the ECC does not receive a read command in block 702, the ECC determines whether it receives a write command from its server (block 716). If the ECC receives a write command, the ECC updates its directories (block 718), stores the data in its cache (block 720), sends a Touch semantic to the storage system (block 722), and sends a copy of the data to its partner ECC (block 724). Thereafter, operation returns to block 702 to determine whether the ECC receives a read command from its server.

If the ECC does not receive a write command from its server in block 716, the ECC determines whether to update data to the storage system (block 726). The ECC may update data to the storage system if the storage system sends an update request to the ECC so the storage system can service a read request from another server, for example. If the ECC determines that it is to update data at the storage system, the ECC sends a copy of the data to the external storage system (block 728). Thereafter, operation returns to block 702 to determine whether the ECC receives a read command from its server.

If the ECC does not update data in block 726, the ECC determines whether it receives an Invalidate semantic (block 730). If the ECC receives an Invalidate semantic, the ECC updates its directory to invalidate the data (block 732). Thereafter, or if the ECC does not receive an Invalidate semantic, operation returns to block 702 to determine whether the ECC receives a read command from its server.

Figure 8:
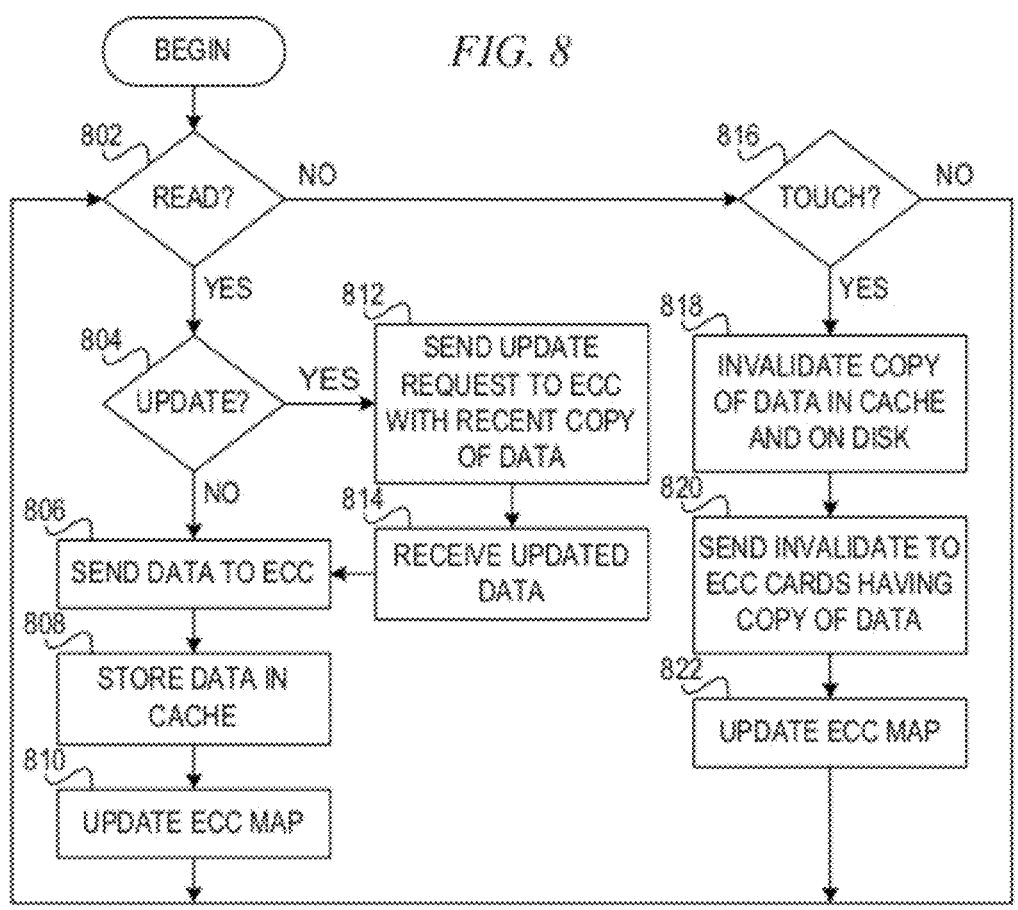
FIG. 8 is a flowchart illustrating operation of a storage system with extended cache card with writeback in accordance with an illustrative embodiment.

FIG. 8 is a flowchart illustrating operation of a storage system with extended cache card with writeback in accordance with an illustrative embodiment. Operation begins, and the storage system determines whether it receives a read request from an ECC (block 802). If the storage system determines that it receives a read request, the storage system determines whether it is to update its copy of the data (block 804). If the storage system determines that it has an up-to-date copy of the data in block 804, the storage system sends the data to the ECC (block 806), stores the data in the cache in the storage system (block 808), and updates an ECC map in the storage system to indicate that the ECC has read a copy of the data (block 810). Thereafter, operation returns to block 802 to determine whether the storage system receives a read request from an ECC.

If the storage system determines that the storage system is to update its copy of the data in block 804, the storage system sends an update request to the ECC with the most up-to-date copy of the data (block 812) and receives updated data from the ECC (block 814). Then, the storage system sends the data to the ECC (block 806), stores the data in the cache in the storage system (block 808), and updates ECC map in the storage system to indicate that the ECC has read a copy of the data (block 810). Thereafter, operation returns to block 802 to determine whether the storage system receives a read request from an ECC.

If the storage system does not receive a read request in block 802, the storage system determines whether it receives a Touch semantic from an ECC (block 816). If the storage system receives a Touch semantic, the storage system invalidates its copy of the data in its cache and on disk (block 818), sends an Invalidate semantic to the ECC cards having a copy of the data (block 820), and updates its ECC map to indicate which ECCs have up-to-date copies of the data (block 822). At this point, only the ECC sending the touch semantic and its partner ECC have the valid data. Thereafter, or if the storage system does not receive a write request in block 816, operation returns to block 802 to determine whether the storage system receives a read request from an ECC.

Thus, the illustrative embodiments provide mechanisms for extending cache for an external storage system into individual servers. Certain servers may have cards with cache in the form of dynamic random access memory (DRAM) and non-volatile storage, such as flash memory or solid-state drives (SSDs), which may be viewed as actual extensions of the external storage system. In this way, the storage system is distributed across the storage area network (SAN) into various servers. Several new semantics are used in communication between the cards and the storage system to keep the read caches coherent.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable storage medium having a computer readable program stored therein, wherein the computer readable program, when executed on an extended cache card, causes the extended cache card to:
   responsive to server data processing system performing a write operation to write a first portion of data to an external storage system, store a copy of the first portion of data in a non-volatile memory of the extended cache card and update a directory bit map in the extended cache card, wherein the extended cache card comprises a host side interface through which the extended cache card connects directly to a bus of the server data processing system, a storage side interface through which the extended cache card connects to a storage area network, and the non-volatile memory, wherein the server data processing system connects to the external storage system via the storage area network, and wherein the directory bit map keeps a record of which servers having extended cache cards store particular portions of data;
   responsive to the server data processing system performing a read operation to read a second portion of data from the external storage system, determine whether the extended cache card stores an up-to-date copy of the second portion of data; and
   responsive to a determination that the extended cache card stores an up-to-date copy of the second portion of data, send the copy of the second portion of data from the extended cache card to the server data processing system.

2. The computer program product of claim 1, wherein the computer readable program further causes the extended cache card to:
   responsive to a determination that the extended cache card does not store an up-to-date copy of the second portion of data, read the second portion of data from the external storage system, store a copy of the second portion of data in the non-volatile memory of the extended cache card, and send the second portion of data from the extended cache card to the server data processing system.

3. The computer program product of claim 2, wherein the extended cache card comprises a redundant array of independent disks (RAID) controller, wherein responsive to the determination that the extended cache card does not store an up-to-date copy of the second portion of data, the RAID controller reads the copy of the second portion of data from the external storage system.

4. The computer program product of claim 1, wherein the computer readable program further causes the extended cache card to:
   responsive to the server data processing system performing the write operation to write the first portion of data to the external storage system, write, by the extended cache card, the first portion of data to the external storage system.

5. The computer program product of claim 4, wherein the computer readable program further causes the extended cache card to:
   search the directory bit map to identify one or more extended cache cards that store a copy of the first portion of data; and
   send an Invalidate semantic to one or more other external cache cards.

6. The computer program product of claim 1, wherein the computer readable program further causes the extended cache card to:
   responsive to a third portion of data aging out of cache in the extended cache card and the third portion of data not being updated by another server, send a copy of the third portion of data from the extended cache card to the external storage system and discard the third portion of data from the extended cache card.

7. The computer program product of claim 1, wherein the computer readable program further causes the extended cache card to:
   responsive to the server data processing system performing the write operation to write the first portion of data to the external storage system, send a Touch semantic from the extended cache card to the external storage system, wherein the Touch semantic indicates at the first portion of data has been updated, and send a copy of the first portion of data to a partner extended cache card directly attached to another server in the storage area network via a bus of the another server.

8. The computer program product of claim 7, wherein the partner extended cache card stores the copy of the first portion of data in a non-volatile memory of the partner extended cache card.

9. The computer program product of claim 7, wherein the extended cache card comprises a redundant array of independent disks (RAID) controller, wherein responsive to the server data processing system performing a read operation to read a fourth portion of data from the external storage system, the RAID controller reads the fourth portion of data from the partner extended cache card.

10. The computer program product of claim 1, wherein the computer readable program further causes the extended cache card to:
- receive an Invalidate semantic from another server, wherein the Invalidate semantic indicates that a fifth portion of data is updated by the another server; and
- update the directory bit map in the extended cache card to invalidate the fifth portion of data in the extended cache card.

11. The computer program product of claim 1, wherein the computer readable program further causes the extended cache card to:
- receive from the external storage system a request for an updated copy of the first portion of data; and
- send a copy of the first portion of data from the extended cache card to the external storage system.

12. The computer program product of claim 1, wherein the extended cache card comprises a redundant array of independent disks (RAID) controller, wherein the RAID controller reads the copy of the second portion of data from the non-volatile memory.

13. An extended cache card, comprising:
- a host side interface through which the extended cache card connects directly to a bus of a server data processing system;
- a storage side interface through which the extended cache card connects to a storage area network;
- a processor;
- a non-volatile memory coupled to the processor for storing copies of data read from or written to an external storage system by the host data processing system; and
- a memory coupled to the processor, wherein the memory comprises instructions which, when executed by the processor, cause the processor to:
  - responsive to a server data processing system performing a write operation to write a first portion of data to an external storage system, store a copy of the first portion of data in the non-volatile memory and update a directory bit map in the extended cache card, wherein the server data processing system connects to the external storage system via the storage area network, and wherein the directory bit map keeps a record of which servers having extended cache cards store particular portions of data;
  - responsive to the server data processing system performing a read operation to read a second portion of data from the external storage system, determine whether the non-volatile memory stores an up-to-date copy of the second portion of data; and
  - responsive to a determination that the extended cache card stores an up-to-date copy of the second portion of data, send the copy of the second portion of data from the extended cache card to the server data processing system.

14. The extended cache card of claim 13, wherein the instructions further cause the processor to:
- responsive to a determination that the extended cache card does not store an up-to-date copy of the second portion of data, read the second portion of data from the external storage system, store a copy of the second portion of data in the non-volatile memory of the extended cache card, and send the second portion of data from the extended cache card to the server data processing system.

15. The tended cache card of claim 14, further comprising:
- a redundant array of independent disks (RAID) controller, wherein responsive to the determination that the extended cache card does not store an up-to-date copy of the second portion of data, the RAID controller reads the copy of the second portion of data from the external storage system.

16. The extended cache card of claim 13, wherein the instructions further cause the processor to:
- responsive to the server data processing system performing the write operation to write the first portion of data to the external storage system, write, by the extended cache card, the first portion of data to the external storage system.

17. The extended cache card of claim 13, further comprising:
- a redundant array of independent disks (RAID) controller, wherein the RAID controller reads the copy of the second portion of data from the non-volatile memory.

18. The extended cache card of claim 13, wherein the instructions further cause the processor to:
- responsive to the server data processing system performing the write operation to write the first portion of data to the external storage system, send a Touch semantic from the extended cache card to the external storage system, wherein the Touch semantic indicates that the first portion of data has been updated, and send a copy of the first portion of data to a partner extended cache card directly attached to another server in the storage area network via a bus of the another server.

19. The extended cache card of claim 18, further comprising:
- a redundant array of independent disks (RAID) controller, wherein responsive to the server data processing system performing a read operation to read a third portion of data from the external storage system, the RAID controller reads the third portion of data from the partner extended cache card.

20. An apparatus, comprising:
- a server data processing system; and
- an extended cache card directly attached to the server data processing system via a bus of the server data processing system, wherein the extended cache card is configured to:
  - responsive to a server data processing system performing a write operation to write a first portion of data to an external storage system, store a copy of the first portion of data in a non-volatile memory of the extended cache card and update a directory bit map in the extended cache card, wherein the extended cache card comprises a host side interface through which the extended cache card connects directly to the bus of the server data processing system, a storage side interface through which the extended cache card connects to a storage area network, and the non-volatile memory, wherein the server data processing system connects to the external storage system via the storage area network, and wherein the directory bit map keeps a record of which servers having extended cache cards store particular portions of data;
  - responsive to the server data processing system performing a read operation to read a second portion of data from an external storage system, determine whether the non-volatile memory stores an up-to-date copy of the second portion of data; and
  - responsive to a determination that the extended cache card stores an up-to-date copy of the second portion of data, send the copy of the second portion of data from the extended cache card to the server data processing system.

* * * * *